(12) United States Patent
Solinas

(10) Patent No.: US 7,062,044 B1
(45) Date of Patent: *Jun. 13, 2006

(54) METHOD OF ELLIPTIC CURVE CRYPTOGRAPHIC KEY AGREEMENT USING COEFFICIENT SPLITTING

(75) Inventor: Jerome A. Solinas, Westminster, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 938 days.

This patent is subject to a terminal disclaimer.

(21) Appl. No.: 10/185,831

(22) Filed: Jun. 28, 2002

(51) Int. Cl.
*H04K 1/00* (2006.01)
*H04L 9/00* (2006.01)
*G06F 7/38* (2006.01)

(52) U.S. Cl. .............. 380/30; 380/4; 708/490
(58) Field of Classification Search .............. None
See application file for complete search history.

(56) References Cited

U.S. PATENT DOCUMENTS

| | | | |
|---|---|---|---|
| 4,200,770 A | 4/1980 | Hellman et al. | |
| 6,212,279 B1 | 4/2001 | Reiter et al. | |
| 6,490,352 B1 * | 12/2002 | Schroeppel | 380/30 |
| 6,618,483 B1 * | 9/2003 | Vanstone et al. | 380/30 |
| 6,778,666 B1 * | 8/2004 | Kuzmich et al. | 380/28 |
| 6,782,100 B1 * | 8/2004 | Vanstone et al. | 380/28 |
| 6,898,284 B1 * | 5/2005 | Solinas | 380/28 |
| 6,993,136 B1 * | 1/2006 | Solinas | 380/278 |

OTHER PUBLICATIONS

Karpynskyy et al, "Elliptic Curve Parameters Generation", Feb. 2004, TCSET '2004, p. 294-295.*
Menezes et al, "Reducing Elliptic Curve Logarithms to Logarithms in a Finite Field", 1991, ACM, p. 80-89.*
Menezes, "Elliptic Curve Public Key Cryptosystems", 1993, Kluwer Academic Publishers, p. 13-34.*
Enge, "Elliptic Curves and Their Applications to Cryptography, An Introduction", 1999, Kluwer Academic Publishers, p. 125-152.*
Rosing, "Implementing Elliptic Curve Cryptography", 1999, Manning Publications Co., p. 129-163.*

(Continued)

*Primary Examiner*—Christopher Revak
(74) *Attorney, Agent, or Firm*—Robert D. Morelli

(57) ABSTRACT

A method of generating a cryptographic key in an authenticated manner using coefficient splitting. Select a prime number p and an elliptic curve of either a first class or a second class. Select a point P. The first user generates $r_a$, $w_a$, and $R_a=r_aP$ and $W_a=w_aP$ via coefficient splitting. The second user generates $r_b$, $w_b$, and $R_b=r_bP$ and $W_b=w_bP$ via coefficient splitting. After the users have exchanged the points $R_a$, $W_a$, $R_b$, $W_b$, the first user generates $c_a$, $g_a$, and $c_aW_b$, and $g_aR_b$ via coefficient splitting, and the second user generates $c_b$, $g_b$, and $c_bW_a$ and $g_bR_a$ via coefficient splitting. Each user then sums the corresponding results to form K and derives the cryptographic key from K in the same user-definable manner. An unauthenticated key exchange method is also presented.

28 Claims, 3 Drawing Sheets

OTHER PUBLICATIONS

Francois Morain, Jorge Olivos, "Speeding up the Computations on an Elliptic Curve Using Addition-Subtraction Chains", Theoretical Informatics & Appls. vol. 24 No. 6 1990, pp. 531-544.

Chae Hoon Lim, Pil Joong Lee, "More Flexible Exponentiation with Precomputation", Crypto-q4, Salinger-Verlag, 1994, pp. 95-107.

R. Gallant, R. Lambert, S. Vanstone, "Faster Point Multiplication on Elliptical Curves with Efficient Endomorphisms", Centre for Applied Cryptographic Research, Corr 20000-S3, 2000.

Laurie Law, Alfred Menezes, Minghua Qu, Jerry Solinas, Scott Vanstone, "An Efficient Protocol for Authenticated Key Agreement", COPP-98-05, Dept. of C&O, Univ. of Waterloo, Canada 1998.

* cited by examiner

METHOD OF ELLIPTIC CURVE CRYPTOGRAPHIC KEY AGREEMENT USING COEFFICIENT SPLITTING

FIELD OF THE INVENTION

This invention relates to cryptography and, more particularly, to a discrete logarithm based key exchange on an elliptic curve using coefficient splitting.

BACKGROUND OF THE INVENTION

Cryptography provides methods of providing privacy and authenticity for remote communications and data storage. Privacy is achieved by encryption of data, usually using the techniques of symmetric cryptography (so called because the same mathematical key is used to encrypt and decrypt the data). Authenticity is achieved by the functions of user identification, data integrity, and message non-repudiation. These are best achieved via asymmetric (or public-key) cryptography.

In particular, public-key cryptography enables encrypted communication between users that have not previously established a shared secret key between them. This is most often done using a combination of symmetric and asymmetric cryptography: public-key techniques are used to establish user identity and a common symmetric key, and a symmetric encryption algorithm is used for the encryption and decryption of the actual messages. The former operation is called key agreement. Prior establishment is necessary in symmetric cryptography, which uses algorithms for which the same key is used to encrypt and decrypt a message. Public-key cryptography, in contrast, is based on key pairs. A key pair consists of a private key and a public key. As the names imply, the private key is kept private by its owner, while the public key is made public (and typically associated to its owner in an authenticated manner). In asymmetric encryption, the encryption step is performed using the public key, and decryption using the private key. Thus the encrypted message can be sent along an insecure channel with the assurance that only the intended recipient can decrypt it. The key agreement can be interactive (e.g., for encrypting a telephone conversation) or non-interactive (e.g., for electronic mail).

The use of cryptographic key pairs was disclosed in U.S. Pat. No. 4,200,770, entitled "CRYPTOGRAPHIC APPARATUS AND METHOD." U.S. Pat. No. 4,200,770 also disclosed the application of key pairs to the problem of key agreement over an insecure communication channel. The algorithms specified in this U.S. Pat. No. 4,200,700 rely for their security on the difficulty of the mathematical problem of finding a discrete logarithm. U.S. Pat. No. 4,200,770 is hereby incorporated by reference into the specification of the present invention.

In a Diffie-Hellman key exchange, two users (e.g., User A and User B) agree on a common G, g, and q. User A generates, or acquires, a secret number a, where $1<a<q$, computes $g^a$, and sends $g^a$ to User B. User B generates, or acquires, a secret number b, where $1<b<q$, computes $g^b$, and sends $g^b$ to User A. User A then computes $(g^b)^a$, while User B computes $(g^a)^b$. Since these two values are mathematically equivalent, the two users are now in possession of the same secret number. A cryptographic key may then be derived from the secret number. The significance of this method is that a private key was established between two users by transmitting information over a public channel (i.e., an adversary sees the information being passed) but without knowing a or b, the key cannot be constructed from the information that is passed over the public channel. If the users keep a and b private and the numbers used to generate the key are large enough so that $g^{(ab)}$ cannot be mathematically derived from $g^a$ and $g^b$ then only the users know the key. In practice, the most common choice for G is the integers mod n, where n is an integer.

Large keys pose problems not only for the adversary but also for the users. Large keys require large amounts of computational power and require large amounts of time in order to generate and use the key. Cryptographers are always looking for ways to quickly generate the shortest keys possible that meet the cryptographic strength required to protect the encrypted message. The payoff for finding such a method is that cryptography can be done faster, cheaper, and in devices that do not have large amounts of computational power (e.g., hand-held smart-cards).

The choice of the group G is critical in a cryptographic system. The discrete log problem may be more difficult in one group and, therefore, cryptographically stronger than in another group, allowing the use of smaller parameters but maintaining the same level of security. Working with small numbers is easier than working with large numbers. Small numbers allow the cryptographic system to be higher performing (i.e., faster) and requires less storage. So, by choosing the right group, a user may be able to work with smaller numbers, make a faster cryptographic system, and get the same, or better, cryptographic strength than from another cryptographic system that uses larger numbers.

The classical choice for G in a Diffie-Hellman key exchange are integers mod n, where n is an integer as well. In 1985, Victor Miller and Neal Koblitz each suggested choosing G from elliptic curves. It is conjectured that choosing such a G allows the use of much smaller parameters, yet the discrete log problem using these groups is as difficult, or more difficult, than integer-based discrete log problems using larger numbers. This allows the users to generate a key that has the same, or better, cryptographic strength as a key generated from an integer G and is shorter than the integer-based key. Since shorter keys are easier to deal with, a cryptographic system based on a shorter key may be faster, cheaper, and implemented in computationally-restricted devices. So, an elliptic curve Diffie-Hellman key exchange method is an improvement over an integer-based Diffie-Hellman key exchange method.

More precisely, an elliptic curve is defined over a field F. An elliptic curve is the set of all ordered pairs (x,y) that satisfy a particular cubic equation over a field F, where x and y are each members of the field F. Each ordered pair is called a point on the elliptic curve. In addition to these points, there is another point O called the point at infinity. The infinity point is the additive identity (i.e., the infinity point plus any other point results in that other point). For cryptographic purposes, elliptic curves are typically chosen with F as the integers mod p for some large prime number p (i.e., $F_p$) or as the field of $2^m$ elements (i.e., $F_{2^m}$).

Multiplication or, more precisely, scalar multiplication is the dominant operation in elliptic curve cryptography. The speed at which multiplication can be done determines the performance of a cryptographic method based on an elliptic curve.

Multiplication of a point P on an elliptic curve by an integer k may be realized by a series of additions (i.e., $kP = P + P + \ldots + P$, where the number of Ps is equal to k). This is very easy to implement in hardware since only an elliptic adder is required, but it is very inefficient. That is, the number of operations is equal to k which may be very large.

The classical approach to elliptic curve multiplication is a double and add approach. For example, if a user wishes to realize kP, where k=25 then 25 is first represented as a binary expansion of 25. That is, 25 is represented as a binary number 11001. Next, P is doubled a number of times equal to the number of bits in the binary expansion minus 1. For ease in generating an equation of the number of operations, the number of doubles is taken as m rather than m−1. The price for simplicity here is being off by 1. In this example, the doubles are 2P, 4P, 8P, and 16P. The doubles correspond to the bit locations in the binary expansion of 25 (i.e., 11001), except for the 1s bit. The doubles that correspond to bit locations that are 1s are then added along with P if the is bit is a 1. The number of adds equals the number of is in the binary expansion. In this example, there are three additions since there are three 1s in the binary expansion of 25 (i.e., 11001). So, 25P=16P+8P+P.

On average, there are m/2 1s in k. This results in m doubles and m/2 additions for a total of 3 m/2 operations. Since the number of bits in k is always less than the value of k, the double and add approach requires fewer operations than does the addition method described above. Therefore, the double and add approach is more efficient (i.e., faster) than the addition approach.

While working on an elliptic curve allows smaller parameters relative to a modular arithmetic based system offering the same security, some of the efficiency advantage of smaller parameters is offset by the added complexity of doing arithmetic on an elliptic curve as opposed to ordinary modular arithmetic. For purposes of determining efficiency, elliptic doubles and elliptic additions are often grouped and considered elliptic operations. To gain even more efficiency advantages by going to elliptic curves, cryptographers seek ways to reduce the cost of an elliptic curve operation, or reduce the number of elliptic operations required. An elliptic curve method that requires fewer operations, or more efficiently executable operations, would result in an increase in the speed, or performance, of any device that implements such a method.

It is no more costly to do elliptic curve subtractions than it is to do elliptic curve additions. Therefore, a doubles and add approach to doing elliptic curve multiplication may be modified to include subtraction where appropriate. There are an infinite number of ways to represent an integer as a signed binary expansion. The negative 1s in a signed binary expansion indicate subtraction in a double-add-subtract method while the positive 1s in the signed binary expansion indicate addition in the double-add-subtract method. For example, 25 may be represented as an unsigned binary number 11001 (i.e., 16+8+1=25) or as one possible signed binary number "1 0-1 0 0 1" (i.e., 32−8+1=25).

In an article entitled "Speeding Up The Computations On An Elliptic Curve Using Addition-Subtraction Chains", authored by Francois Morain and Jorge Olivos, published in *Theoretical Informatics and Applications*, Vol. 24, No. 6, 1990, pp. 531–544, the authors disclose an improvement to the double/add/subtract method mentioned above by placing a restriction on the signed binary expansion that results in fewer elliptic additions being required to do an elliptic curve multiplication and, therefore, increase the performance (i.e., speed) of elliptic curve multiplication. Messrs. Morain and Olivos proposed generating a signed binary expansion such that no two adjacent bit locations in the signed binary expansion are non-zero (i.e., two 1s, irrespective of polarity, may not be next to each other). Such a signed binary expansion is called a non-adjacent form (NAF) of a signed binary expansion. It has been shown that a NAF signed binary expansion is unique (i.e., each integer has only one NAF signed binary expansion) and contains the minimum number of 1s, irrespective of polarity. By minimizing the 1s, the number of additions is minimized. The improvement proposed by Messrs. Morain and Olivos still requires m doubles but only requires an average of m/3 additions for a total of 4 m/3 elliptic curve operations. This is less than the 3m/2 elliptic curve operations required by the classical double and add method described above.

Further savings can be obtained by restricting oneself to specific curves chosen specially to possess properties that allow scalar multiplication to be carried out using fewer operations than is possible in the general case. In the case in which F is the field of 2^m elements, the best way to do this is to use reduced tau-adic expansions on a Koblitz curve as disclosed in U.S. Pat. No. 6,212,279, entitled "METHOD OF ELLIPTIC CURVE CRYPTOGRAPHIC KEY EXCHANGE USING REDUCED BASE TAU EXPANSION 1N NON-ADJACENT FORM. However, the method of U.S. Pat. No. 6,212,279 does not provide the best method of minimizing the number of operations when the field is the set of integers (mod p) for some large prime number p. U.S. Pat. No. 6,212,279 is hereby incorporated by reference into the specification of the present invention.

The general approach of prior art methods is to express the desired result as the sum of two scalar multiples, i.e. to write nP in the form $n_0P_0+n_1P_1$. The resulting expression is then evaluated by what is commonly referred to as twin multiplication. This is done via a double-add-subtract binary method using signed binary expansions of $n_0$ and $n_1$.

The above approach can be significantly less expensive than the ordinary addition-subtraction method, but the advantage is usually mitigated by extra computations needed to compute $n_0$, $n_1$, $P_0$, and $P_1$ from n and P. The precise cost of these computations depends on the specific method used to implement this approach.

Chae Hoon Lim and Pil Joong Lee, in an article entitled "More Flexible Exponentiation with Precomputation," *Crypto '94*, Springer-Verlag, 1994, pp. 95–107, disclose a method of finding $n_0$, $n_1$, and $P_0$. However, the method of Lim and Lee requires an auxiliary computation to determine the value of $P_1$. Because of this extra computation, the method of Lim and Lee is advantageous only when it is required to take more than one multiple of the same point P.

R. Gallant, R. Lambert, and S. Vanstone, in an article entitled "Faster Point Multiplication on Elliptic Curves with Efficient Endomorphisms," *Centre for Applied Cryptographic Research* technical research report CORR 20000-53, 2000, disclose a method of finding $P_0$ and $P_1$. However, the method of Gallant et al. requires an auxiliary computation to determine the value of $n_0$ and $n_1$. The efficiency of the method of Gallant et al. is reduced by having to compute $n_0$ and $n_1$.

The present invention does not require the extra computations of the methods of either Gallant et al. or Lim and Lee.

More complicated key agreement protocols called authenticated key agreement methods work as follows. The users agree in advance on a field F, a curve E, and a base point P of order q. User A generates a private key $w_a$ and a corresponding public key $W_a=w_aP$ and similarly user B generates a private key $w_b$ and a corresponding public key $W_b=w_bP$. User A generates a private key $r_a$ and a corresponding public key $R_a=r_aP$ and sends $W_a$ and $R_a$ to user B. Similarly, user B generates a private key $r_b$ and a corresponding public key $R_b=r_bP$ and sends $W_b$ and $R_b$ to user A. User A now combines the values $w_a$, $r_a$, $W_b$, and $R_b$ in a certain way to obtain a number $c_a$, and also combines the values $w_a$, $r_a$, $W_b$, and $R_b$ in a second way to obtain a number $g_a$. Similarly, user B combines the values $w_b$, $r_b$, $W_a$, and $R_a$ in a certain way to obtain a number $c_b$, and also combines the values $w_b$, $r_b$, $W_a$, and $R_a$ in a second way to obtain a number $g_b$. This is done in such a way that $c_a w_b + g_a r_b$ and $c_b w_a + g_b r_a$ are equal modulo q. User A now computes the shared secret value by evaluating $c_a W_b + g_a R_b$, and User B computes the same value by evaluating $c_b W_a + g_b R_a$. An example of such a protocol is the MQV algorithm disclosed in a paper by L. Law et al. entitled "An Efficient Protocol for Authenticated Key Agreement" in Technical Report COPP 98-05, Dept. of C&O, University of Waterloo, Canada, 1998.

SUMMARY OF THE INVENTION

It is an object of the present invention to generate a cryptographic key between two users in an efficient manner.

It is another object of the present invention to generate a cryptographic key between two users in an efficient manner using an elliptic curve.

It is another object of the present invention to generate a cryptographic key between two users in an efficient manner using coefficient splitting on an elliptic curve chosen from a first class of elliptic curves and on a second class of elliptic curves.

The present invention is a method of generating a cryptographic key using coefficient splitting on two different classes of elliptic curves. The present invention is implementable in a non-authenticated key exchange method and in an authenticated key exchange method.

The steps of the present invention in a non-authenticated key exchange method are as follows. The first step of the method is selecting a prime number p.

The second step of the method is selecting an elliptic curve from either a first class or a second class of elliptic curves.

The third step of the method is selecting a point P on the elliptic curve.

The fourth step of the method is generating, by the first user, an integer $w_a$.

The fifth step of the method is generating, by the second user, an integer $w_b$.

The sixth step of the method is generating, by the first user, the point $W_a = w_a P$, via coefficient splitting and performing a twin multiplication via a double-add-subtract method.

The seventh step of the method is generating, by the second user, the point $W_b = w_b P$, via coefficient splitting and performing a twin multiplication via a double-add-subtract method.

The eighth step of the method is transmitting, by the first user, the point $W_a$ to the second user.

The ninth step of the method is transmitting, by the second user, the point $W_b$ to the first user.

The tenth step of the method is generating, by the first user, the point $K = w_a W_b$ via coefficient splitting and performing a twin multiplication via a double-add-subtract method.

The eleventh step of the method is generating, by the second user, the point $K = w_b W_a$ via coefficient splitting and performing a twin multiplication via a double-add-subtract method.

The twelfth, and last, step of the method is deriving, by the first user and the second user, the cryptographic key from K.

The steps of the present invention in an authenticated key exchange method are as follows.

The first step of the method is selecting a prime number p.

The second step of the method is selecting an elliptic curve from either a first class or a second class of elliptic curves.

The third step of the method is selecting a point P on the elliptic curve.

The fourth step of the method is generating, by the first user, an integer $w_a$.

The fifth step of the method is generating, by the second user, an integer $w_b$.

The sixth step of the method is generating, by the first user, the point $W_a = w_a P$, via coefficient splitting and performing a twin multiplication via a double-add-subtract method.

The seventh step of the method is generating, by the second user, the point $W_b = w_b P$, via coefficient splitting and performing a twin multiplication via a double-add-subtract method.

The eighth step of the method is generating, by the first user, an integer $r_a$.

The ninth step of the method is generating, by the second user, an integer $r_b$.

The tenth step of the method is generating, by the first user, the point $R_a = r_a P$, via coefficient splitting and performing a twin multiplication via a double-add-subtract method.

The eleventh step of the method is generating, by the second user, the point $R_b = r_b P$, via coefficient splitting and performing a twin multiplication via a double-add-subtract method.

The twelfth step of the method is transmitting, by the first user, the points $W_a$ and $R_a$ to the second user.

The thirteenth step of the method is transmitting, by the second user, the points $W_b$ and $R_b$ to the first user.

The fourteenth step of the method is combining, by the first user, the values $w_a$, $r_a$, $W_b$, and $R_b$ in a user-definable manner to generate a number $c_a$.

The fifteenth step of the method is combining, by the second user, the values $w_b$, $r_b$, $W_a$, and $R_a$ to generate a number $c_b$.

The sixteenth step of the method is combining, by the first user, the values $w_a$, $r_a$, $W_b$, and $R_b$ to generate a number $g_a$.

The seventeenth step of the method is combining, by the second user, the values $w_b$, $r_b$, $W_a$, and $R_a$ to generate a number $g_b$.

The eighteenth step of the method is generating, by the first user, the point $c_a W_b$ via coefficient splitting and performing a twin multiplication via a double-add-subtract method.

The nineteenth step of the method is generating, by the first user, the point $g_a R_b$ via coefficient splitting and performing a twin multiplication via a double-add-subtract method.

The twentieth step of the method is summing, by the first user, the results of the eighteenth step and the nineteenth step to form K.

The twenty-first step of the method is generating, by the second user, the point $c_b W_a$ via coefficient splitting and performing a twin multiplication via a double-add-subtract method.

The twenty-second step of the method is generating, by the second user, the point $g_b R_a$ via coefficient splitting and performing a twin multiplication via a double-add-subtract method.

The twenty-third step of the method is summing, by the second user, the results of the twenty-first step and the twenty-second step to form K.

The twenty-fourth, and last, step of the method is deriving, by the first user and the second user, the cryptographic key from K.

DETAILED DESCRIPTION

The present invention is an efficient method of generating (i.e., agreeing upon) a cryptographic key between a first user and a second user. The efficiencies of the present method are achieved by reducing the time it takes to perform scalar multiplication. The time reduction is achieved by performing scalar multiplications by the method of coefficient splitting followed by a twin multiplication using a double-add-subtract binary method. The present invention uses a field that is a set of integers (mod p), where p is a prime number.

The present invention requires the fewest total number of elliptic curve operations for an elliptic curve multiplication as compared to prior art methods of key agreement using elliptic curves over a field $F_p$. The present method transforms a desired scalar multiple into the sum of two other scalar multiples, the coefficients of which each having a bit length about half that of the original coefficient. This is accomplished by expressing each new coefficient as a linear function of the high-order bits and the low-order bits of the original coefficient. Such an expression is referred to in the present invention as coefficient splitting. Then, twin multiplication on the new expression of each coefficient is carried out using a double-add-subtract method described in the Background section above. Coefficient splitting is much faster than the transformations used in the prior art cryptographic key agreement methods. Thus the use of coefficient splitting results in a faster cryptographic key agreement method than those of the prior art.

Figure 1:
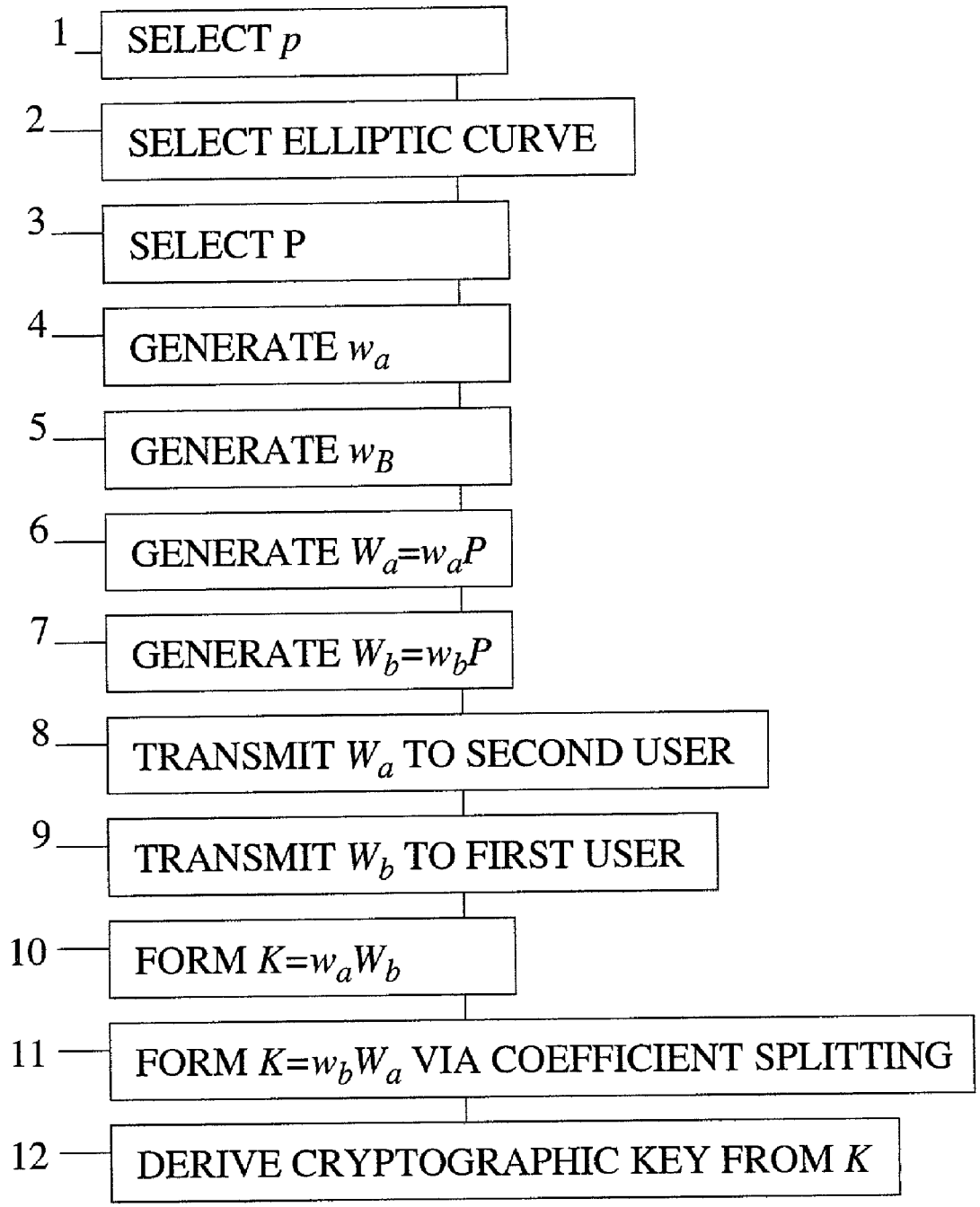
FIG. 1 is a list of steps for the non-authenticated key agreement method of the present invention.

FIG. 1 is a list of steps of an un-authenticated key agreement method of the present invention. The first step 1 of the present invention is for the users (i.e., a first user and a second user) to acquire, or select, the same prime number p. The prime number p should be large and approximately equal to $2^{(2d)}$ for some integer d. Computations will take place over the field of integers modulo p.

The second step 2 of the present invention is for each user to acquire or select the same elliptic curve E. The elliptic curve is defined over the field of integers modulo p. The number of points on E must be divisible by a large prime q, which is known to the users and may be a public parameter. Moreover, the elliptic curve E selected must be of one of two types.

Elliptic curves of the first type have equation $$E: y^2 = x^3 + A*x,$$

where A is a fixed integer modulo p, and must satisfy the following property: there exists a number w and small integers h and k such that, if (x,y) is a point on E for which the scalar multiple q*(x,y) is the identity point O, then $$(2^d)*(x,y) = k*(x,y) + h*(-x, w*y)$$

Elliptic curves of the second type have equation $$E: y^2 = x^3 + B,$$

where B is a fixed integer modulo p, and must satisfy the following property: there exists a number w and small integers h and k such that, if (x,y) is a point on E for which the scalar multiple q*(x,y) is the identity point O, then $$(2^d)*(x,y) = k*(x,y) + h*(w*x, y).$$

The third step 3 of the present invention is for each user to acquire, or select, the same base point P of order q, and where each user knows the order q. E, P, q, h, k, and w may be publicly known parameters.

The fourth step 4 of the present invention is generating, by the first user, an integer $w_a$, where $w_a$ is a private key.

The fifth step 5 of the present invention is generating by the second user, an integer $w_b$, where $w_b$ is a private key.

The sixth step 6 of the present invention is generating, by the first user, the point $W_a = w_a P$. This is done by converting the expression $w_a P$ into the sum of two scalar multiples via coefficient splitting, and performing a twin multiplication via a double-add-subtract method. The steps for performing coefficient splitting using the first class of elliptic curves are listed in FIG. 2 and described below. The steps for performing coefficient splitting using the second class of elliptic curves are listed in FIG. 3 and described below. The steps listed in FIG. 2 and FIG. 3 apply to any coefficient consisting of an integer times a point on the curve. For the sake of efficiency, the two coefficient splitting method will each be described only once.

The seventh step 7 of the present invention is generating, by the second user, the point $W_b = w_b P$. This is done by converting the expression $w_b P$ into the sum of two scalar multiples via coefficient splitting, and performing a twin multiplication via a double-add-subtract method.

The eighth step 8 of the present invention is transmitting, by the first user, the point $W_a$ to the second user.

The ninth step 9 of the present invention is transmitting, by the second user, the point $W_b$ to the first user.

The tenth step 10 of the present invention is generating, by the first user, the point $K = w_a W_b$. This is done by converting the expression $w_a W_b$ into the sum of two scalar multiples via coefficient splitting, and performing a twin multiplication via a double-add-subtract method.

The eleventh step 11 of the present invention is generating, by the second user, the point $K = w_b W_a$. This is done by converting the expression $w_b W_a$ into the sum of two scalar multiples via coefficient splitting, and performing a twin multiplication via a double-add-subtract method.

The twelfth, and last, step 12 of the present invention is deriving, by the first user and the second user, the cryptographic key from K in the same user-definable manner.

Figure 2:
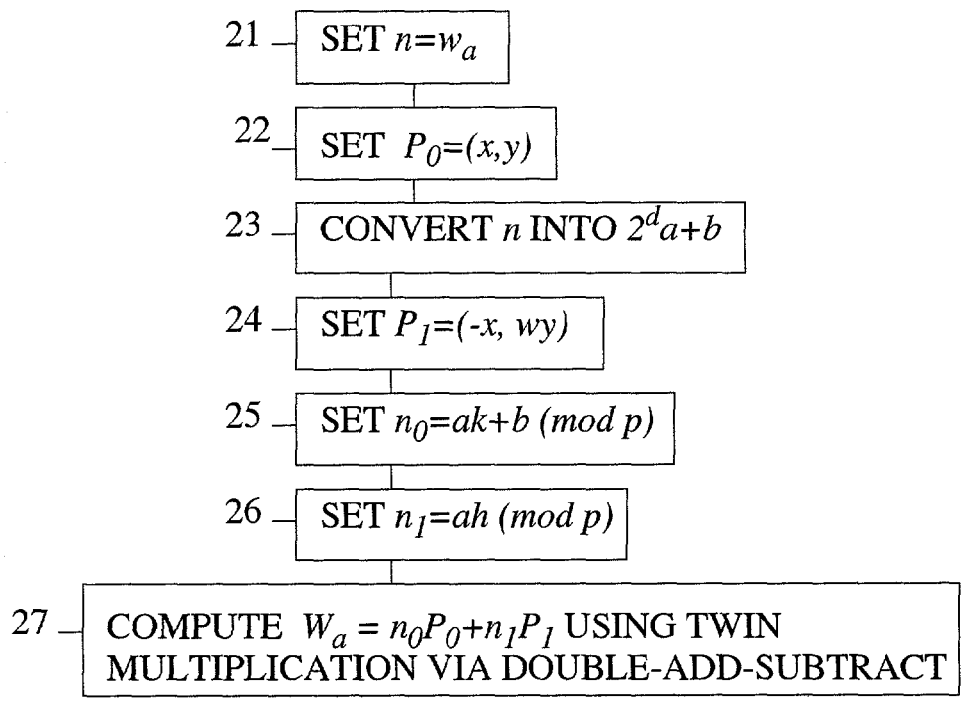
FIG. 2 is a list of steps for coefficient splitting using the first class of elliptic curves.

FIG. 2 is a list of steps for performing coefficient splitting on any product of an integer and a point on the first type of elliptic curve that appears in the present invention (i.e., $w_a P$, $r_a P$, $w_b P$, $r_b P$, $w_a W_b$, $c_a W_b$, $g_a R_b$, $w_b W_a$, $c_b W_a$, and $g_b R_a$).

The first step 21 of the coefficient splitting method is setting n equal to the integer in question (i.e., $r_a$, $w_a$, $r_b$, $w_b$, $c_a$, $g_a$, $c_b$, or $g_b$).

The second step 22 of the coefficient splitting method is setting $P_0 = (x,y)$, where (x,y) are coordinates of the point in question (i.e., P, $W_b$, $R_b$, $W_a$, or $R_a$).

The third step 23 of the coefficient splitting method is converting the integer in question into the form $2^d a+b$, where a and b are integers.

The fourth step 24 of the coefficient splitting method is setting $P_1=(-x, wy)$.

The fifth step 25 of the coefficient splitting method is setting $n_0=ak+b \pmod{p}$.

The sixth step 26 of the coefficient splitting method is setting $n_1=ah \pmod{p}$.

The seventh, and last, step 27 of the coefficient splitting method is computing $T=n_0 P_0+n_1 P_1$ using twin multiplication via a double-add-subtract method and returning the same as the scalar multiple of the point in question by the integer in question.

Figure 3:
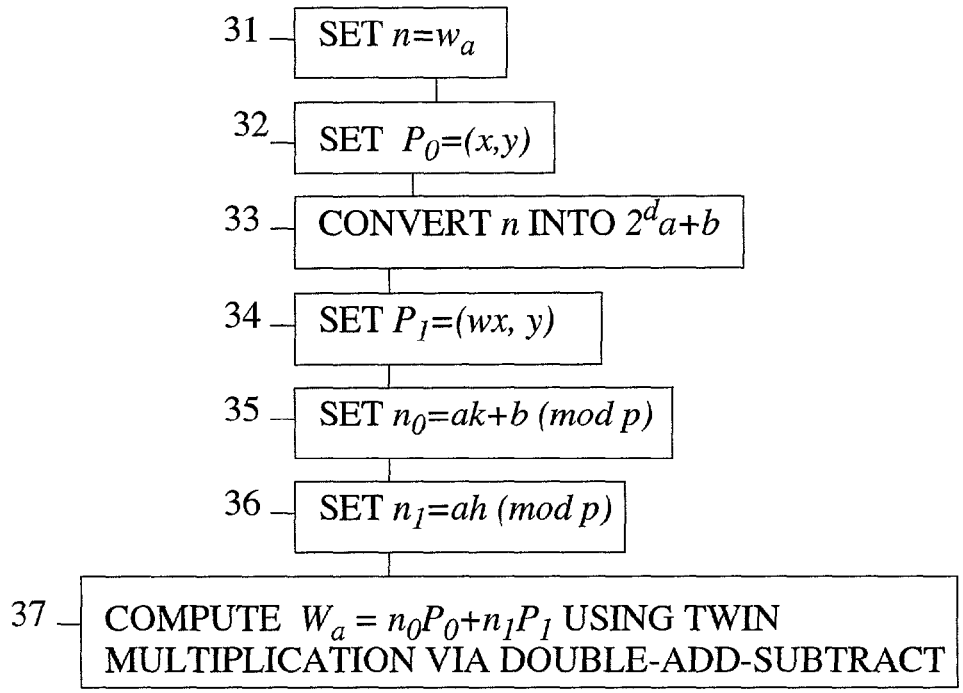
FIG. 3 is a list of steps for coefficient splitting using the second class of elliptic curves.

FIG. 3 is a list of steps for performing coefficient splitting on any product of an integer and a point on the second type of elliptic curve that appears in the present invention (i.e., $w_a P$, $r_a P$, $w_b P$, $r_b P$, $w_a W_b$, $c_a W_b$, $g_a R_b$, $w_b W_a$, $c_b W_a$, and $g_b R_a$).

The first step 31 of the coefficient splitting method is setting n equal to the integer in question (i.e., $r_a$, $w_a$, $r_b$, $w_b$, $c_a$, $g_a$, $c_b$, or $g_b$).

The second step 32 of the coefficient splitting method is setting $P_0=(x,y)$, where $(x,y)$ are coordinates of the point in question (i.e., P, $W_b$, $R_b$, $W_a$, or $R_a$).

The third step 33 of the coefficient splitting method is converting the integer in question into the form $2^d a+b$, where a and b are integers.

The fourth step 34 of the coefficient splitting method is setting $P_1=(wx, y)$.

The fifth step 35 of the coefficient splitting method is setting $n_0=ak+b \pmod{p}$.

The sixth step 36 of the coefficient splitting method is setting $n_1=ah \pmod{p}$.

The seventh, and last, step 37 of the coefficient splitting method is computing $T=n_0 P_0+n_1 P_1$ using twin multiplication via a double-add-subtract method and returning the same as the scalar multiple of the point in question by the integer in question.

Figure 4:
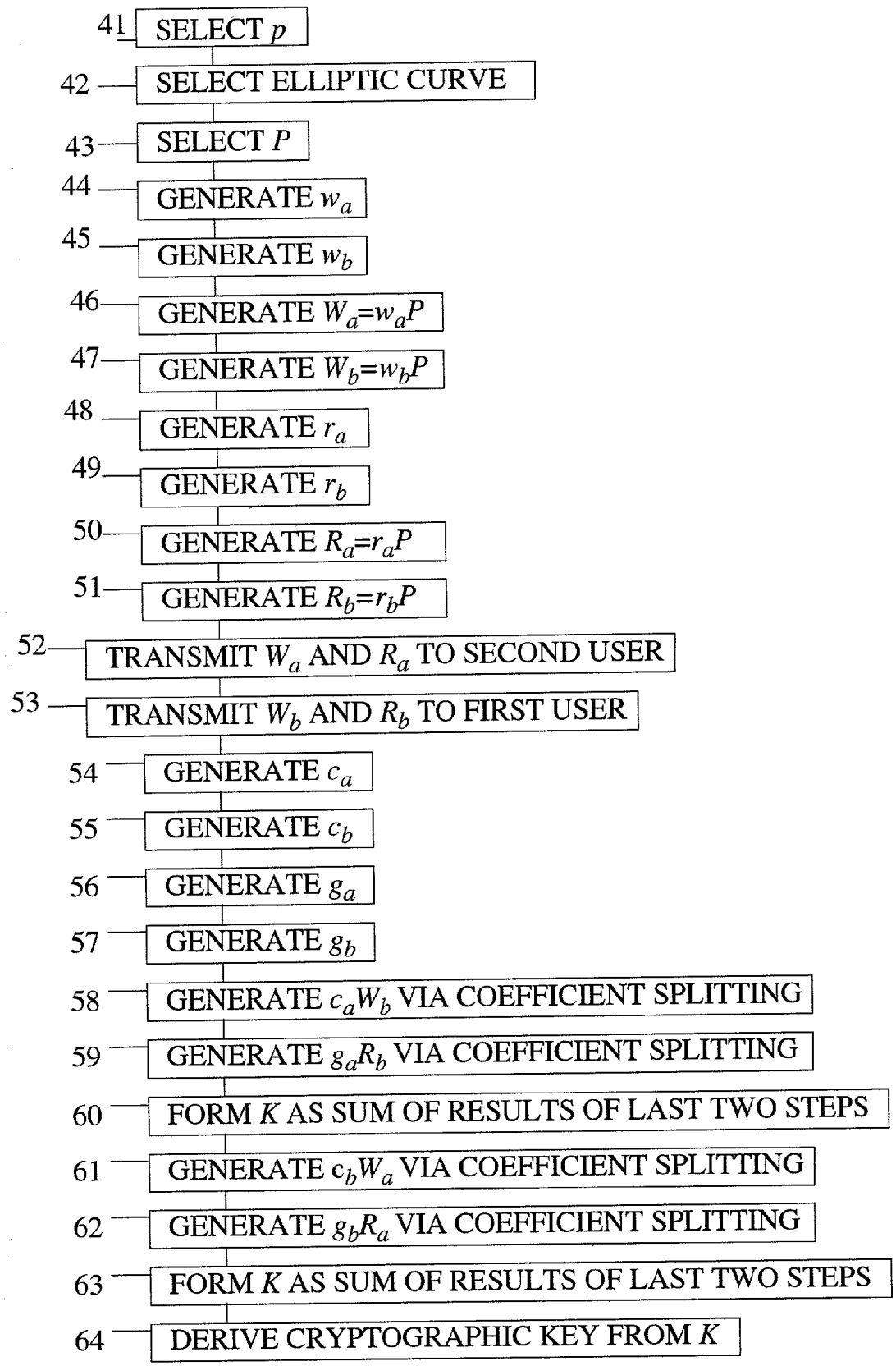
FIG. 4 is a list of steps for the authenticated key agreement method of the present invention.

FIG. 4 is a list of steps of the authenticated key agreement method of the present invention. The first step 41 of the method of the present invention is for the users (i.e., a first user and a second user) to acquire or select the same prime number p. The prime number p should be large and approximately equal to $2^{(2d)}$ for some integer d. Computations will take place over the field of integers modulo p.

The second step 42 of the present invention is for each user to acquire or select the same elliptic curve E. The elliptic curve is defined over the field of integers modulo p. The number of points on E must be divisible by a large prime q, which is known to the users and may be a public parameter. Moreover, the elliptic curve E selected must be of one of two types.

Elliptic curves of the first type have equation $$E: y^2=x^3+A*x,$$

where A is a fixed integer modulo p, and must satisfy the following property: there exists a number w and small integers h and k such that, if $(x,y)$ is a point on E for which the scalar multiple $q*(x,y)$ is the identity point O, then $$(2^d)*(x,y)=k*(x,y)+h*(-x,w*y).$$

Elliptic curves of the second type have equation $$E: y^2=x^3+B,$$

where B is a fixed integer modulo p, and must satisfy the following property: there exists a number w and small integers h and k such that, if $(x,y)$ is a point on E for which the scalar multiple $q*(x,y)$ is the identity point O, then $$(2^d)*(x,y)=k*(x,y)+h*(w*x,y).$$

The third step 43 of the present invention is for each user to acquire, or select, the same base point P of order q, and where each user knows the order q. E, P, q, h, k, and w may be publicly known parameters.

The fourth step 44 of the present invention is generating, by the first user, an integer $w_a$, where $w_a$ is a private key.

The fifth step 45 of the present invention is generating by the second user, an integer $w_b$, where $w_b$ is a private key.

The sixth step 46 of the present invention is generating, by the first user, the point $W_a=w_a P$. This is done by converting the expression $w_a P$ into the sum of two scalar multiples via coefficient splitting, and performing a twin multiplication via a double-add-subtract method.

The seventh step 47 of the present invention is generating, by the second user, the point $W_b=w_b P$. This is done by converting the expression $w_b P$ into the sum of two scalar multiples via coefficient splitting, and performing a twin multiplication via a double-add-subtract method.

The eighth step 48 of the present invention is generating, by the first user, an integer $r_a$.

The ninth step 49 of the present invention is generating by the second user, an integer $r_b$.

The tenth step 50 of the present invention is generating, by the first user, the point $R_a=r_a P$. This is done by converting the expression $r_a P$ into the sum of two scalar multiples via coefficient splitting, and performing a twin multiplication via a double-add-subtract method.

The eleventh step 51 of the present invention is generating, by the second user, the point $R_b=r_b P$. This is done by converting the expression $r_b P$ into the sum of two scalar multiples via coefficient splitting, and performing a twin multiplication via a double-add-subtract method.

The twelfth step 52 of the present invention is transmitting, by the first user, the points $W_a$ and $R_a$ to the second user.

The thirteenth step 53 of the present invention is transmitting, by the second user, the points $W_b$ and $R_b$ to the first user.

The fourteenth step 54 of the present invention is combining, by the first user, the values $w_a$, $r_a$, $W_b$, and $R_b$ in a user-definable manner to generate a number $c_a$.

The fifteenth step 55 of the present invention is combining, by the second user, the values $w_b$, $r_b$, $W_a$, and $R_a$ in a user-definable manner to generate a number $c_b$, where the user-definable functions in the fourteenth step 54 and the fifteenth step 55 are the same except for subscript differences.

The sixteenth step 56 of the present invention is combining, by the first user, the values $w_a$, $r_a$, $W_b$, and $R_b$ in a user-definable manner to generate a number $g_a$.

The seventeenth step 57 of the present invention is combining, by the second user, the values $w_b$, $r_b$, $W_a$, and $R_a$ in a user-definable manner to generate a number $g_b$, where the user-definable functions in the sixteenth step 56 and the seventeenth step 57 are the same except for subscript differences.

The eighteenth step 58 of the present invention is generating, by the first user, the point $c_a W_b$. This is done by converting the expression $c_a W_b$ into the sum of two scalar multiples via coefficient splitting, and performing a twin multiplication via a double-add-subtract method.

The nineteenth step 59 of the present invention is generating, by the first user, the point $g_a R_b$. This is done by converting the expression $g_a R_b$ into the sum of two scalar multiples via coefficient splitting, and performing a twin multiplication via a double-add-subtract method.

The twentieth step 60 of the present invention is summing, by the first user, the results of the eighteenth step 58 and the nineteenth step 59 to form a secret value K.

The twenty-first step 61 of the present invention is generating, by the second user, the point $c_b W_a$. This is done by converting the expression $c_b W_a$ into the sum of two scalar multiples via coefficient splitting, and performing a twin multiplication via a double-add-subtract method.

The twenty-second step 62 of the present invention is generating, by the second user, the point $g_b R_a$. This is done by converting the expression $g_b R_a$ into the sum of two scalar multiples via coefficient splitting, and performing a twin multiplication via a double-add-subtract method.

The twenty-third step 63 of the present invention is summing, by the second user, the results of the twenty-first step 61 and the twenty-second step 62 to form a secret value K.

The twenty-fourth, and last, step 64 of the present invention is deriving, by the first user and the second user, the cryptographic key from K in the same user-definable manner.

Once the cryptographic key is generated, it may be used to encrypt a message using any suitable encryption method that requires a cryptographic key.

What is claimed is:

1. A method of generating a cryptographic key between a first user and a second user, comprising the steps of:
    a) selecting, between the first user and the second user, a prime number p that is approximately equal to $2^{(2d)}$, where d is an integer;
    b) selecting, between the first user and the second user, an elliptic curve, where the elliptic curve is defined over a field of integers modulo p and divisible by a prime number q, known by the first user and the second user, and where the elliptic curve is selected from a group of elliptic curves consisting of a first type and a second type; where the elliptic curves of the first type are defined by $y^2 = x^3 + A*x \pmod{p}$, where A is an integer modulo p, and there exists a number w and integers h and k such that, if (x,y) is a point on the curve for which $q*(x,y)$ is the identity point O, then $(2^d)*(x,y) = k*(x,y) + h*(-x, w*y)$; where the elliptic curves of the second type are defined by $y^2 = x^3 + B \pmod{p}$, where B is an integer modulo p, and there exists a number w and integers h and k such that, if (x,y) is a point on the curve for which $q*(x,y)$ is the identity point O, then $(2^d)*(x,y) = k*(x,y) + h*(w*x, y)$;
    c) selecting, between the first user and the second user, a point P of order q;
    d) generating, by the first user, an integer $w_a$;
    e) generating by the second user, an integer $w_b$;
    f) generating, by the first user, the point $W_a = w_a P$ via coefficient splitting;
    g) generating, by the second user, the point $W_b = w_b P$ via coefficient splitting;
    h) transmitting, by the first user, the point $W_a$ to the second user;
    i) transmitting, by the second user, the point $W_b$ to the first user;
    j) generating, by the first user, the point $K = w_a W_b$ via coefficient splitting;
    k) generating, by the second user, the point $K = w_b W_a$ via coefficient splitting;
    l) deriving the cryptographic key from K by the first user and the second user in a same user-definable manner.

2. The method of claim 1, wherein the step of generating, by the first user, the point $W_a = w_a P$ via coefficient splitting, if an elliptic curve of the first type was selected in step (b), is comprised of the steps of:
    a) setting $n = w_a$;
    b) setting $P_0 = (x,y)$, where (x,y) are coordinates of point P;
    c) converting n into the form $2^d a + b$, where a and b are integers;
    d) setting $P_1 = (-x, wy)$;
    e) setting $n_0 = ak + b \pmod{p}$;
    f) setting $n_1 = ah \pmod{p}$; and
    g) computing $W_a = n_0 P_0 + n_1 P_1$ using twin multiplication via a double-add-subtract method.

3. The method of claim 1, wherein the step of generating, by the first user, the point $W_a = w_a P$ via coefficient splitting, if an elliptic curve of the second type was selected in step (b), is comprised of the steps of:
    a) setting $n = w_a$;
    b) setting $P_0 = (x,y)$, where (x,y) are coordinates of point P;
    c) converting n into the form $2^d a + b$, where a and b are integers;
    d) setting $P_1 = (wx, y)$;
    e) setting $n_0 = ak + b \pmod{p}$;
    f) setting $n_1 = ah \pmod{p}$; and
    g) computing $W_a = n_0 P_0 + n_1 P_1$ using twin multiplication via a double-add-subtract method.

4. The method of claim 1, wherein the step of generating, by the first user, the point $W_b = w_b P$ via coefficient splitting, if an elliptic curve of the first type was selected in step (b), is comprised of the steps of:
    a) setting $n = w_b$;
    b) setting $P_0 = (x,y)$, where (x,y) are coordinates of point P;
    c) converting n into the form $2^d a + b$, where a and b are integers;
    d) setting $P_1 = (-x, wy)$;
    e) setting $n_0 = ak + b \pmod{p}$;
    f) setting $n_1 = ah \pmod{p}$; and
    g) computing $W_b = n_0 P_0 + n_1 P_1$ using twin multiplication via a double-add-subtract method.

5. The method of claim 1, wherein the step of generating, by the first user, the point $W_b = w_a P$ via coefficient splitting, if an elliptic curve of the second type was selected in step (b), is comprised of the steps of:
    a) setting $n = w_b$;
    b) setting $P_0 = (x,y)$, where (x,y) are coordinates of point P;
    c) converting n into the form $2^d a + b$, where a and b are integers;
    d) setting $P_1 = (wx, y)$;
    e) setting $n_0 = ak + b \pmod{p}$;
    f) setting $n_1 = ah \pmod{p}$; and
    g) computing $W_b = n_0 P_{+n_1} P_1$ using twin multiplication via a double-add-subtract method.

6. The method of claim 1, wherein the step of generating, by the first user, the point $K = w_a W_b$ via coefficient splitting, if an elliptic curve of the first type was selected in step (b), is comprised of the steps of:
    a) setting $n = w_a$;
    b) setting $P_0 = (x,y)$, where (x,y) are coordinates of point $W_b$;
    c) converting n into the form $2^d a + b$, where a and b are integers;
    d) setting $P_1 = (-x, wy)$;
    e) setting $n_0 = ak + b \pmod{p}$;

f) setting $n_1$=ah (mod p); and
g) computing K=$n_0 P_0 + n_1 P_1$ using twin multiplication via a double-add-subtract method.

7. The method of claim 1, wherein the step of generating, by the first user, the point K=$w_a W_b$ via coefficient splitting, if an elliptic curve of the second type was selected in step (b), is comprised of the steps of:
   a) setting n=$w_a$;
   b) setting $P_0$=(x,y), where (x,y) are coordinates of point $W_b$;
   c) converting n into the form $2^d a + b$, where a and b are integers;
   d) setting $P_1$=(wx, y);
   e) setting n=ak+b (mod p);
   f) setting $n_1$=ah (mod p); and
   g) computing K=$n_0 P_0 + n_1 P_1$ using twin multiplication via a double-add-subtract method.

8. The method of claim 1, wherein the step of generating, by the first user, the point K=$w_b W_a$ via coefficient splitting, if an elliptic curve of the first type was selected in step (b), is comprised of the steps of:
   a) setting n=$w_b$;
   b) setting $P_0$=(x,y), where (x,y) are coordinates of point $W_a$;
   c) converting n into the form $2^d a + b$, where a and b are integers;
   d) setting $P_1$=(-x, wy);
   e) setting $n_0$=ak+b (mod p);
   f) setting $n_1$=ah (mod p); and
   g) computing K=$n_0 P_0 + n_1 P_1$ using twin multiplication via a double-add-subtract method.

9. The method of claim 1, wherein the step of generating, by the first user, the point K=$w_b W_a$ via coefficient splitting, if an elliptic curve of the second type was selected in step (b), is comprised of the steps of:
   a) setting n=$w_b$;
   b) setting $P_0$=(x,y), where (x,y) are coordinates of point $W_a$;
   c) converting n into the form $2^d a + b$, where a and b are integers;
   d) setting $P_1$=(wx, y);
   e) setting $n_0$=ak+b (mod p);
   f) setting $n_1$=ah (mod p); and
   g) computing K=$n_0 P_0 + n_1 P_1$ using twin multiplication via a double-add-subtract method.

10. A method of generating a cryptographic key between a first user and a second user, comprising the steps of:
   a) selecting, between the first user and the second user, a prime number p that is approximately equal to $2^{(2d)}$, where d is an integer;
   b) selecting, between the first user and the second user, an elliptic curve, where the elliptic curve is defined over a field of integers modulo p and divisible by a prime number q, known by the first user and the second user, and where the elliptic curve is selected from a group of elliptic curves consisting of a first type and a second type; where the elliptic curves of the first type are defined by $y^2 = x^3 + A*x$ (mod p), where A is an integer modulo p, and there exists a number w and integers h and k such that, if (x,y) is a point on the curve for which q*(x,y) is the identity point O, then $(2^d)*(x,y)$=k*(x,y)+h*(-x,w*y); where the elliptic curves of the second type are defined by $y^2 = x^3 + B$ (mod p), where B is an integer modulo p, and there exists a number w and integers h and k such that, if (x,y) is a point on the curve for which q*(x,y) is the identity point O, then $(2^d)*(x,y)$=k*(x,y)+h*(w*x,y);
   c) selecting, between the first user and the second user, a point P of order q;
   d) generating, by the first user, an integer $w_a$;
   e) generating by the second user, an integer $w_b$;
   f) generating, by the first user, the point $W_a$=$w_a P$ via coefficient splitting;
   g) generating, by the second user, the point $W_b$=$w_b P$ via coefficient splitting;
   h) generating, by the first user, an integer $r_a$;
   i) generating by the second user, an integer $r_b$;
   j) generating, by the first user, the point $R_a$=$r_b P$ via coefficient splitting;
   k) generating, by the second user, the point $R_b$=$r_b P$ via coefficient splitting;
   l) transmitting, by the first user, the points $W_a$ and $R_a$ to the second user;
   m) transmitting, by the second user, the points $W_b$ and $R_b$ to the first user;
   n) generating $c_a$, by the first user, where $c_a$ is a user-definable function of $w_a$, $r_a$, $W_b$, and $R_b$;
   o) generating $c_b$, by the second user, where $c_b$ is a user-definable function of $w_b$, $r_b$, $W_a$, and $R_a$, where the user-definable functions in step (n) and step (O) are the same except for subscript differences;
   p) generating $g_a$, by the first user, where $g_a$ is a user-definable function of $w_a$, $r_a$, $W_b$, and $R_b$;
   q) generating $g_b$, by the second user, where $g_b$ is a user-definable function of $w_b$, $r_b$, $W_a$, and $R_a$, where the user-definable functions in step (p) and step (q) are the same except for subscript differences;
   r) generating, by the first user, the point $c_a W_b$ via coefficient splitting;
   s) generating, by the first user, the point $g_a R_b$ via coefficient splitting;
   t) summing, by the first user, the results of step (r) and step (s) to form K;
   u) generating, by the second user, the point $c_b W_a$ via coefficient splitting;
   v) generating, by the second user, the point $g_b R_a$ via coefficient splitting;
   w) summing, by the second user, the results of step (u) and step (v) to form K; and
   x) deriving the cryptographic key from K by the first user and the second user in a same user-definable manner.

11. The method of claim 10, wherein the step of generating, by the first user, the point $W_a$=$w_a P$ via coefficient splitting, if an elliptic curve of the first type was selected in step (b), is comprised of the steps of:
   a) setting n=$w_a$;
   b) setting $P_0$=(x,y), where (x,y) are coordinates of point P;
   c) converting n into the form $2^d a + b$, where a and b are integers;
   d) setting $P_1$=(-x, wy);
   e) setting $n_0$=ak+b (mod p);
   f) setting $n_1$=ah (mod p); and
   g) computing $W_a$=$n_0 P_0 + n_1 P_1$ using twin multiplication via a double-add-subtract method.

12. The method of claim 10, wherein the step of generating, by the first user, the point $W_a$=$w_a P$ via coefficient splitting, if an elliptic curve of the second type was selected in step (b), is comprised of the steps of:
   a) setting n=$w_a$;
   b) setting $P_0$=(x,y), where (x,y) are coordinates of point P;
   c) converting n into the form $2^d a + b$, where a and b are integers;
   d) setting $P_1$=(wx, y);
   e) setting $n_0$=ak+b (mod p);

f) setting $n_1$=ah (mod p); and
g) computing $W_a=n_0P_0+n_1P_1$ using twin multiplication via a double-add-subtract method.

13. The method of claim 10, wherein the step of generating, by the first user, the point $W_b=w_bP$ via coefficient splitting, if an elliptic curve of the first type was selected in step (b), is comprised of the steps of:
   a) setting n=$w_b$;
   b) setting $P_0$=(x,y), where (x,y) are coordinates of point P;
   c) converting n into the form $2^da+b$, where a and b are integers;
   d) setting $P_1$=(−x, wy);
   e) setting $n_0$=ak+b (mod p);
   f) setting $n_1$=ah (mod p); and
   g) computing $W_b=n_0P_0+n_1P_1$ using twin multiplication via a double-add-subtract method.

14. The method of claim 10, wherein the step of generating, by the first user, the point $W_b=W_bP$ via coefficient splitting, if an elliptic curve of the second type was selected in step (b), is comprised of the steps of:
   a) setting n=$W_b$;
   b) setting $P_0$=(x,y), where (x,y) are coordinates of point P;
   c) converting n into the form $2^da+b$, where a and b are integers;
   d) setting $P_1$=(wx, y);
   e) setting $n_0$=ak+b (mod p);
   f) setting $n_1$=ah (mod p); and
   g) computing $W_b=n_0P_0+n_1P_1$ using twin multiplication via a double-add-subtract method.

15. The method of claim 10, wherein the step of generating, by the first user, the point $R_a=r_aP$ via coefficient splitting, if an elliptic curve of the first type was selected in step (b), is comprised of the steps of:
   a) setting n=$r_a$;
   b) setting $P_0$=(x,y), where (x,y) are coordinates of point P;
   c) converting n into the form $2^da+b$, where a and b are integers;
   d) setting $P_1$=(−x, wy);
   e) setting $n_0$=ak+b (mod p);
   f) setting $n_1$=ah (mod p); and
   g) computing $R_a=n_0P_0+n_1P_1$ using twin multiplication via a double-add-subtract method.

16. The method of claim 10, wherein the step of generating, by the first user, the point $R_a=r_aP$ via coefficient splitting, if an elliptic curve of the second type was selected in step (b), is comprised of the steps of:
   a) setting n=$r_a$;
   b) setting $P_0$=(x,y), where (x,y) are coordinates of point P;
   c) converting n into the form $2^da+b$, where a and b are integers;
   d) setting $P_1$=(wx, y);
   e) setting $n_0$=ak+b (mod p);
   f) setting $n_1$=ah (mod p); and
   g) computing $R_a=n_0P_0+n_1P_1$ using twin multiplication via a double-add-subtract method.

17. The method of claim 10, wherein the step of generating, by the first user, the point $R_b=r_bP$ via coefficient splitting, if an elliptic curve of the first type was selected in step (b), is comprised of the steps of:
   a) setting n=$r_b$;
   b) setting $P_0$=(x,y), where (x,y) are coordinates of point P;
   c) converting n into the form $2^da+b$, where a and b are integers;
   d) setting $P_1$=(−x, wy);
   e) setting $n_0$=ak+b (mod p);
   f) setting $n_1$=ah (mod p); and
   g) computing $R_b=n_0P_0+n_1P_1$ using twin multiplication via a double-add-subtract method.

18. The method of claim 10, wherein the step of generating, by the first user, the point $R_b=r_bP$ via coefficient splitting, if an elliptic curve of the second type was selected in step (b), is comprised of the steps of:
   a) setting n=$r_b$;
   b) setting $P_0$=(x,y), where (x,y) are coordinates of point P;
   c) converting n into the form $2^da+b$, where a and b are integers;
   d) setting $P_1$=(wx, y);
   e) setting $n_0$=ak+b (mod p);
   f) setting $n_1$=ah (mod p); and
   g) computing $R_b=n_0P_0+n_1P_1$ using twin multiplication via a double-add-subtract method.

19. The method of claim 10, wherein the step of generating, by the first user, the point $c_aW_b$ via coefficient splitting, if an elliptic curve of the first type was selected in step (b), is comprised of the steps of:
   a) setting n=$c_a$;
   b) setting $P_0$=(x,y), where (x,y) are coordinates of point $W_b$;
   c) converting n into the form $2^da+b$, where a and b are integers;
   d) setting $P_1$=(−x, wy);
   e) setting $n_0$=ak+b (mod p);
   f) setting $n_1$=ah (mod p); and
   g) computing $c_aW_b=n_0P_{+n1}P_1$ using twin multiplication via a double-add-subtract method.

20. The method of claim 10, wherein the step of generating, by the first user, the point $c_a W_b$ via coefficient splitting, if an elliptic curve of the second type was selected in step (b), is comprised of the steps of:
   a) setting n=$c_a$;
   b) setting $P_0$=(x,y), where (x,y) are coordinates of point $W_b$;
   c) converting n into the form $2^da+b$, where a and b are integers;
   d) setting $P_1$=(wx, y);
   e) setting $n_0$=ak+b (mod p);
   f) setting $n_1$=ah (mod p); and
   g) computing $c_aW_b=n_0P_0+n_1P_1$ using twin multiplication via a double-add-subtract method.

21. The method of claim 10, wherein the step of generating, by the first user, the point $c_bW_a$ via coefficient splitting, if an elliptic curve of the first type was selected in step (b), is comprised of the steps of:
   a) setting n=$c_b$;
   b) setting $P_0$=(x,y), where (x,y) are coordinates of point $W_a$;
   c) converting n into the form $2^da+b$, where a and b are integers;
   d) setting $P_1$=(−x, wy);
   e) setting $n_0$=ak+b (mod p);
   f) setting $n_1$=ah (mod p); and
   g) computing $c_bW_a=n_0P_0+n_1P_1$ using twin multiplication via a double-add-subtract method.

22. The method of claim 10, wherein the step of generating, by the first user, the point $c_bW_a$ via coefficient splitting, if an elliptic curve of the second type was selected in step (b), is comprised of the steps of:
   a) setting n=$c_b$;
   b) setting $P_0$=(x,y), where (x,y) are coordinates of point $W_a$;
   c) converting n into the form $2^da+b$, where a and b are integers;
   d) setting $P_1$=(wx, y);

e) setting $n_0$=ak+b (mod p);
f) setting $n_1$=ah (mod p); and
g) computing $c_b W_a = n_0 P_0 + n_1 P_1$ using twin multiplication via a double-add-subtract method.

23. The method of claim 10, wherein the step of generating, by the first user, the point $g_a R_b$ via coefficient splitting, if an elliptic curve of the first type was selected in step (b), is comprised of the steps of:
   a) setting n=$g_a$;
   b) setting $P_0$=(x,y), where (x,y) are coordinates of point $R_b$;
   c) converting n into the form $2^d a + b$, where a and b are integers;
   d) setting $P_1$=(-x, wy);
   e) setting $n_0$=ak+b (mod p);
   f) setting $n_1$=ah (mod p); and
   g) computing $g_a R_b = n_0 P_0 + n_1 P_1$ using twin multiplication via a double-add-subtract method.

24. The method of claim 10, wherein the step of generating, by the first user, the point $g_a R_b$ via coefficient splitting, if an elliptic curve of the second type was selected in step (b), is comprised of the steps of:
   a) setting n=$g_a$;
   b) setting $P_0$=(x,y), where (x,y) are coordinates of point $R_b$;
   c) converting n into the form $2^d a + b$, where a and b are integers;
   d) setting $P_1$=(wx, y);
   e) setting $n_0$=ak+b (mod p);
   f) setting $n_1$=ah (mod p); and
   g) computing $g_a R_b = n_0 P_0 + n_1 P_1$ using twin multiplication via a double-add-subtract method.

25. The method of claim 10, wherein the step of generating, by the first user, the point $g_b R_a$ via coefficient splitting, if an elliptic curve of the first type was selected in step (b), is comprised of the steps of:
   a) setting n=$g_b$;
   b) setting $P_0$=(x,y), where (x,y) are coordinates of point $R_a$;
   c) converting n into the form $2^d a + b$, where a and b are integers;
   d) setting $P_1$=(-x, wy);
   e) setting $n_0$=ak+b (mod p);
   f) setting $n_1$=ah (mod p); and
   g) computing $g_b R_a = n_0 P_0 + n_1 P_1$ using twin multiplication via a double-add-subtract method.

26. The method of claim 10, wherein the step of generating, by the first user, the point $g_b R_a$ via coefficient splitting, if an elliptic curve of the second type was selected in step (b), is comprised of the steps of:
   a) setting n=$g_b$;
   b) setting $P_0$=(x,y), where (x,y) are coordinates of point $R_a$;
   c) converting n into the form $2^d a + b$, where a and b are integers;
   d) setting $P_1$=(wx, y);
   e) setting $n_0$=ak+b (mod p);
   f) setting $n_1$=ah (mod p); and
   g) computing $g_b R_a = n_0 P_0 + n_1 P_1$ using twin multiplication via a double-add-subtract method.

27. The method of claim 1, further including the step of encrypting a message with the cryptographic key using a suitable encryption method.

28. The method of claim 10, further including the step of encrypting a message with the cryptographic key using a suitable encryption method.

* * * * *